United States Patent [19]
Brambilla et al.

[11] Patent Number: 5,961,060
[45] Date of Patent: Oct. 5, 1999

[54] BELT ROLLER FOR A SAFETY BELT SYSTEM OF A PASSENGER SEAT

[75] Inventors: Luigi Brambilla, Boeblingen; Walter Jahn, Ehningen, both of Germany

[73] Assignee: Daimler-Benz Aktiengesellschaft, Stuttgart, Germany

[21] Appl. No.: 09/129,389

[22] Filed: Aug. 5, 1998

[30] Foreign Application Priority Data

Aug. 5, 1997 [DE] Germany .......................... 197 33 787

[51] Int. Cl.⁶ .................................................. B65H 75/48
[52] U.S. Cl. ...................................... 242/379.1; 280/805
[58] Field of Search .................................. 242/374, 379.1; 280/805, 806; 200/61.58 B; 297/480

[56] References Cited

U.S. PATENT DOCUMENTS 5,785,269  7/1998  Miller, III et al. .................. 242/379.1

FOREIGN PATENT DOCUMENTS 27 27 470  1/1979  Germany .
43 44 656  5/1995  Germany .
196 53 510  6/1997  Germany .

Primary Examiner—Donald P. Walsh
Assistant Examiner—William A. Rivera
Attorney, Agent, or Firm—Evenson, McKeown, Edwards & Lenahan, PLLC

[57] ABSTRACT

In a belt roller for a safety belt system, a rod assembly has a torsion rod as well as at least one torsion sleeve which surrounds it coaxially. A stopping mechanism is provided with at least two axially offset stopping element sections, which can be adjusted either individually or jointly to the at least one torsion sleeve and to the torsion rod through the use of a control mechanism depending on the energy absorption capacity to be applied.

12 Claims, 1 Drawing Sheet

BELT ROLLER FOR A SAFETY BELT SYSTEM OF A PASSENGER SEAT

BACKGROUND AND SUMMARY OF THE INVENTION

This application claims the priority of German Application No. 197 33 787.2, filed Aug. 5, 1997, the disclosure of which is expressly incorporated by reference herein.

The invention involves a belt roller for a safety belt system of a passenger seat, especially in a motor vehicle, with a pivoted hollow shaft used for rolling up a belt band and with a torsion rod structure placed coaxially inside the hollow shaft and connected with a twistlock thereto, to which devices to adjust its energy absorption capacity are allocated depending on the weight of the person sitting on the passenger seat, and with a blocking mechanism which can be brought to make an effective connection with the torsion rod structure to stop the hollow shaft in response to a defined jerk on the belt band.

Such a belt roller is known from German Patent document DE 27 27 470 A1. The belt roller has a hollow shaft, on which the belt band to be pulled out is rolled up. The hollow shaft is penetrated coaxially by a torsion rod structure shaped like a single torsion rod, the clamping length of which is adjustable by a sliding sleeve. The relocation of the sliding sleeve and hence also the change in the energy absorption capacity of the torsion rod is accomplished through the use of a cable pull control which connects directly to a seat surface of the passenger seat. Depending on how deep the seat surface is depressed by the weight of the person sitting on this seat, an appropriate relocation of the sliding sleeve necessarily takes place and, accordingly, the limit desired in each case is imposed on the belt power. The torsion rod is connected to the hollow shaft with a twistlock on one side and can be activated on the opposite side by a stopping mechanism, which is activated in the well-known manner by a jerk on the belt band of the safety belt during its acceleration.

From German Patent document DE 43 44 656 C1 an additional belt roller is known, the belt power limitation of which is adjustable in accordance with the weight of the person sitting on the passenger seat. For this purpose, a conically shaped torsion rod has been provided, which is also axially adjustable by a corresponding activation mechanism, thus creating the corresponding change in the energy absorption capacity of the torsion rod.

It is the purpose of the present invention to create a belt roller of the above-mentioned type which provides a simple means of adjusting the belt power limitation to account for the different types of people having different weights who sit on the passenger seat.

The present invention solves this task by the fact that the torsion rod assembly has a torsion rod and at least one torsion sleeve coaxially surrounding it, and that the stopping mechanism is equipped with at least two stopping element sections which can be adjusted either individually or jointly to the (at least one) torsion sleeve or to the torsion rod by means of a control mechanism depending on the energy absorption capacity to be applied. This permits a gradual change in the energy absorption capacity, with the number of steps to set the energy absorption capacity being defined by the number of torsion sleeves mounted radially and coaxially to enclose the torsion rod on the outside.

According to the invention, the means to change the energy absorption capacity of the torsion rod assembly are provided directly in the area of the stopping mechanism and not—as in the current state of the art—on the opposite side of the belt roller. For this reason, there is a savings on construction components and a space-saving arrangement. The axial shift of the stopping sections makes it possible for all the stopping sections to act simultaneously, so that the torsion rod assembly can be blocked either partially or totally by the stopping blocking mechanism.

In one preferred embodiment of the invention, the stopping element sections are located on a common stopping element, with the stopping element sections being placed at intervals in the direction of adjustment in such a way that the stopping element section activating the torsion rod is the first to achieve an effective connection with the torsion rod. This configuration ensures that the torsion rod itself is activated in the first stage of the belt power limitation. During the second stage, a joint activation of the torsion rod and the first torsion sleeve takes place, and, if possible, in a third stage the supplementary activation of the third torsion sleeve takes place, and so on.

In another preferred embodiment of the invention, the stopping element sections are shaped as stopping gear elements that are adjustable radially to the torsion rod assembly, and, both on the torsion rod and on the (at least one) torsion sleeve, corresponding ring gears are provided. Due to the radial adjustability of the stopping gear elements, no additional construction space is required for the belt roller in the axial direction. Preferably, the ring gears are designed as toothed gears mounted on the adjacent front sides of the torsion rod and of the (at least one) torsion sleeve. The stopping gear elements are designed as pawls.

In another preferred embodiment of the invention, at least one catch that can be adjusted by the control unit is assigned to the stopping element. The catch limits the stopping element in its adjustment path for a gradual effective connection with the torsion rod assembly. The catch can preferably be moved electromagnetically between its rest position and its operating position, which appropriately blocks the stopping element, with the shift of the catch by the control unit resulting from an electronic recognition of the weight in the area of the seat surface of the passenger seat.

In yet another preferred embodiment of the invention, a gear notch of the ring gear on the torsion rod is configured in such a way that the respective stopping gear element meshes in both the first and the last step of the effective connection with the torsion rod assembly. This guarantees that, with extremely simple means, the torsion rod assembly is effective at all stages of the belt power limitation.

Other objects, advantages and novel features of the present invention will become apparent from the following detailed description of the invention when considered in conjunction with the accompanying drawings.

DETAILED DESCRIPTION OF THE DRAWINGS

Figure 1:
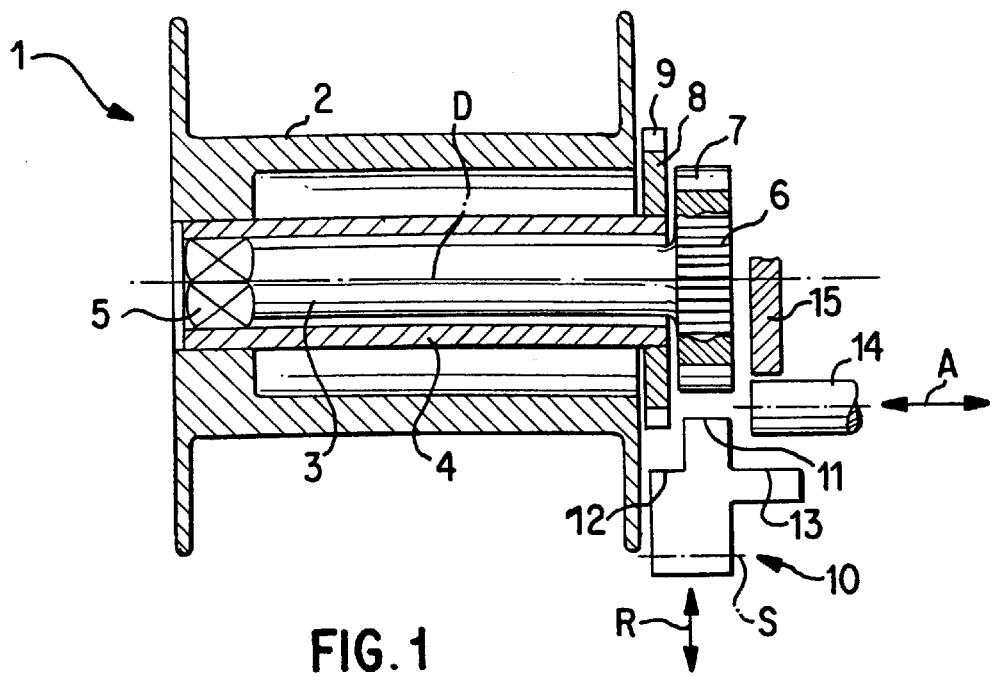
FIG. 1 is a diagram of a longitudinal section through an embodiment of a belt roller according to the invention, which is equipped with a two-step belt power limitation.
Figure 2:
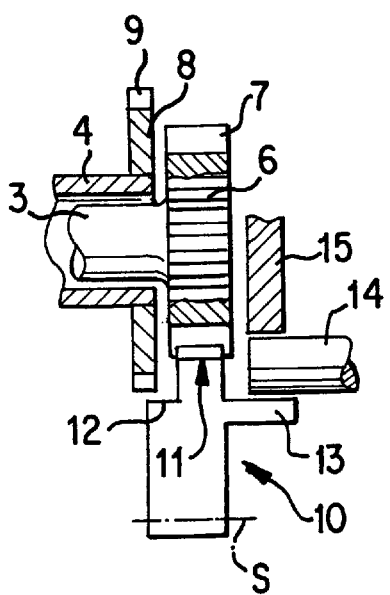
FIG. 2 is a section of the belt roller according to FIG. 1, during the first stage of the belt power limitation.
Figure 3:
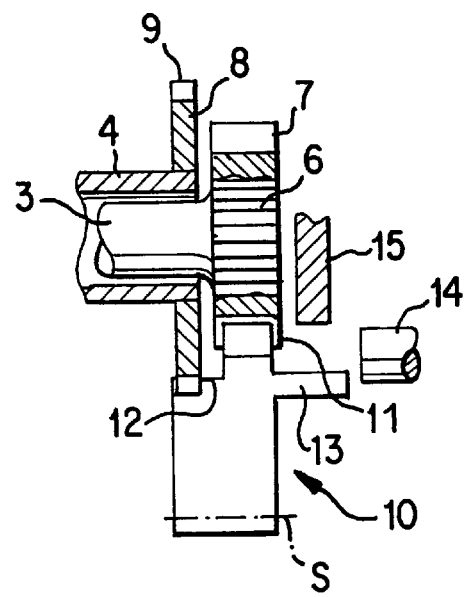
FIG. 3 is a cut out according to FIG. 2 in a second stage of the belt power limiter.

A belt roller according to FIGS. 1 through 3 is part of a safety belt system for a vehicle passenger seat. The belt roller has a hollow shaft 1, which on its outer circumference is equipped with a winding area 2 to wind up a belt band of the safety belt. The hollow shaft 1, 2 has been mounted with freedom to rotate around a rotational axis D in a known manner. In addition, a retraction mechanism (not shown) is located in the hollow shaft 1, 2 which, in a known manner, effects the automatic rolling up of the belt band (not shown).

Starting from a defined acceleration of the extraction of the belt band, further turning of the hollow shaft 1, 2 is stopped, so that the safety belt is locked (blocked) in the position it was originally fastened. This occurs in a known manner when the motor vehicle decelerates suddenly and the person sitting in the seat of the vehicle accelerates forward as a result. Through the locking of the safety belt, the actual restraining function of the safety belt is performed during this vehicular deceleration. In order to achieve the stopping of the hollow shaft 1, 2, this shaft has been placed in a stopping mechanism (not shown in detail), which, in a known manner, through the corresponding centrifugal force causes a catch pawl 10 to fall when the belt band is extracted with a jerk, this catch pawl being a stopping element of the stopping mechanism. The catch pawl 10 is mounted with freedom to swivel around an axis S parallel to the rotational axis D. The catch pawl 10 acts on a corresponding outer gear 7 (designed as a ring gear) of a toothed gear 6, which is mounted in a fixed position on the front end of a torsion rod 3 that moves axially outward through the hollow shaft 1, 2. The torsion rod 3 is part of a torsion rod assembly, which serves to limit the belt power—as described below in greater detail. The torsion rod 3 is placed within the hollow shaft 1, 2 coaxially to the rotational axis D and connected rigidly at its opposite end to the hollow shaft 1, 2. For this purpose, this end of the torsion rod 3 is fastened to a corresponding inner flange of the hollow shaft 1, 2, by means of a fastening device 5.

Another part of the torsion rod assembly is a torsion sleeve 4, which surrounds the torsion rod 3 coaxially at a short distance and also projects with its end (on the right in FIGS. 1 to 3) beyond the corresponding end of the hollow shaft 1, 2. The torsion sleeve 4 can also be deformed when rotated during energy absorption. Both the torsion sleeve 4 and the torsion rod 3 are clamped in the same form-fitting manner in the area of their respective opposite ends, so that a twistlock connection with the hollow shaft 1, 2 is achieved. In addition, on the face of the torsion sleeve 4 that projects from the hollow shaft 1, 2, there is mounted with a twistlock a toothed gear 8 provided with an external gear 9 designed as a ring gear, with both the toothed gear 8 and the toothed gear 6 preferably being welded to the torsion sleeve 4 and the torsion rod 3, respectively. The toothed gear 8 is displaced axially in a parallel radial plane with respect to the toothed gear 6 and is not as thick as the toothed gear 6. The diameter of the toothed gear 8 is larger that the diameter of the toothed gear 6.

Further rotation of the hollow shaft 1, 2 is prevented by the dropping of the catch pawl 10 into the external gear 7 of the toothed gear 6, while the torsion of the torsion rod 3 causes a certain further relaxation of the belt band and, accordingly, imposes the desired limit on the belt power. The catch pawl 10 has two stop sections 11, 12 serving as stopping element sections in the form of stopping gear elements, with the stopping element 11 being assigned to the external gear 7 of the toothed gear 6 and the second stopping element 12 being assigned to the external gear 9 of the toothed gear 8. The catch pawl 10 falls radially into the two toothed gears 6, 8, with the stopping sections 11, 12 being displaced with respect to one another along the direction of adjustment R in such a manner that the stopping section 11 first falls into the external gear 7 of the toothed gear 6, without the stopping section 12 coming into contact with the external gear 9 of the toothed gear 8 (FIG. 2). If the catch pawl 10 is radially swivelled still further inward, in the direction of adjustment R (FIG. 3), then the stopping section 12 will also fall into the external gear 9 of the toothed gear 8, as a backup. In this position, the catch pawl 10 thus activates both the toothed gears 6, 8 and thus the entire torsion assembly as well, in other words, both the torsion rod 3 and the torsion sleeve 4. The depth of the toothing of the external gear 7 is dimensioned in such a manner that even in the first position of the stopping section 11, as shown in FIG. 2, a sufficient blocking of the toothed gear 6 is achieved and that, however, in addition, a further, radial inward movement of the catch pawl 10 is still possible, due the corresponding depth of the toothing of the external gear 7, in order to ensure that the second stopping section 12 can also fall into the axially displaced external gear 9 of the toothed gear 8.

As soon as both stopping sections 11, 12 have fallen into the respective external gears 7, 9, both the torsion rod 3 and the torsion sleeve 4 can be twisted at once, producing a belt power limitation at a higher level. The belt roller shown in FIGS. 1 to 3 thus permits a two-step belt power limitation.

So that the two-step nature of the belt power limitation can be reliably controlled, a one-piece projection 13, projecting axially outward is provided on the stop pawl 10. The one-piece projection 13 can strike on a stop tappet 14. This stop tappet 14 is mounted so that it can move linearly and axially in the direction of arrow A between a rest position (FIG. 3) and an operating position (FIGS. 1 and 2). The stop tappet 14 is activated by a control unit, which, depending on the weight of the person who sits on the car seat, causes a shift of stop tappet 14 in its operating position or its rest position. The stop tappet 14 is supported by a housing part 15 of a belt roller housing (not shown in detail, because it is already known), so that it cannot be pushed aside by the force of the falling catch pawl 10. As soon as the stop tappet 14 has reached its operating position, the projection 13 is arranged in the direction of the arrow R in the stop tappet 14 when the catch pawl drops; this blocks any further movement of the catch pawl 10. In this operating position of the stop tappet 14 only the stop section 11 meshes with the outer gear 7 of toothed gear 6, so that the stopping mechanism has effective contact with the hollow rod 1, 2 only via the torsion rod 3. The former step is suitable for people with lesser weight. In the event the control unit—as described briefly below—has recognized that a heavier person is sitting on the car seat, the stop tappet 14 will be withdrawn to its rest position, thus causing the stopping mechanism to come into effective contact with the entire torsion rod assembly, i.e. both with the torsion rod 3 and with the torsion sleeve 4. The belt power limitation is hence increased proportionally.

The stop tappet 14 is preferably activated by an electromagnet actuator, which is controlled by the control unit. In the area of a seat surface of the car seat, an electronic weight recognition system has been provided, which connects through the corresponding signal wires to the control unit. The control unit evaluates the corresponding weight recognition signals and sends the corresponding control commands to activate or deactivate the electromagnet, thus causing the corresponding linear shift of the stop tappet 14. Preferably, the stop tappet 14 is activated in one direction by a spring, so that the electromagnet's function is required only for the shift in the other direction.

Similarly, the shift of the stop tappet 14 can also be carried out by means of cable tension according to the embodiments of the state of the art considered in the descriptive introduction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Belt roller for a safety belt system of a passenger seat with a pivoted hollow shaft used for rolling up a belt band and with a torsion rod assembly placed coaxially inside the hollow shaft and connected with a twistlock thereto, to which hollow shaft devices are provided to adjust the hollow shaft's energy absorption capacity depending on a weight of a person sitting on the passenger seat, and with a blocking mechanism which is brought to make an effective connection with the torsion rod assembly to stop the hollow shaft in response to a defined, jerk on the belt band, wherein the torsion rod assembly comprises a torsion rod and at least one torsion sleeve coaxially surrounding the torsion rod, and wherein the blocking mechanism is equipped with at least two axially offset stopping element sections which are adjusted individually or jointly to the torsion rod and the at least one torsion sleeve via a control unit depending on the energy absorption capacity to be applied; and wherein the stopping element sections are located on a common stopping element, with the stopping element sections being placed at intervals in a direction of adjustment of the stopping element such that one stopping element section activating the torsion rod is the first to achieve an effective connection with the torsion rod.

2. Belt roller according to claim 1, wherein the stopping element sections are shaped as stopping gear elements that are radially adjustable to the torsion rod assembly and wherein corresponding ring gears are provided on both the torsion rod and on the at least one torsion sleeve.

3. Belt roller according to claim 2, wherein the stopping element is at least positioned on a stop tappet that is adjustable by the control unit, which limits the stopping element in its adjustment path for a gradual effective connection with the torsion rod assembly.

4. Belt roller according to claim 2, wherein a depth of a toothing of a ring gear of the torsion rod is dimensioned such that both in a first position and in a last position of one stopping section, a sufficiently effective contact with the torsion rod assembly is achieved.

5. Belt roller according to claim 1, wherein the stopping element is at least positioned on a stop tappet that is adjustable by the control unit, which limits the stopping element in its adjustment path for a gradual effective connection with the torsion rod assembly.

6. Belt roller according to claim 5, wherein a depth of a toothing of a ring gear of the torsion rod is dimensioned such that both in a first position and in a last position of one stopping section, a sufficiently effective contact with the torsion rod assembly is achieved.

7. Belt roller according to claim 1, wherein a depth of a toothing of a ring gear of the torsion rod is dimensioned such that both in a first position and in a last position of one stopping section, a sufficiently effective contact with the torsion rod assembly is achieved.

8. Belt roller for a safety belt system of a passenger seat with a pivoted hollow shaft used for rolling up a belt band and with a torsion rod assembly placed coaxially inside the hollow shaft and connected with a twistlock thereto, to which hollow shaft devices are provided to adjust the hollow shaft's energy absorption capacity depending on a weight of a person sitting on the passenger seat, and with a blocking mechanism which is brought to make an effective connection with the torsion rod assembly to stop the hollow shaft in response to a defined, jerk on the belt band, wherein the torsion rod assembly comprises a torsion rod and at least one torsion sleeve coaxially surrounding the torsion rod, and wherein the blocking mechanism is equipped with at least two axially offset stopping element sections which are adjusted individually or jointly to the torsion rod and the at least one torsion sleeve via a control unit depending on the energy absorption capacity to be applied; and wherein a depth of a toothing of a ring gear of the torsion rod is dimensioned such that both in a first position and in a last position of one stopping section, a sufficiently effective contact with the torsion rod assembly is achieved.

9. Belt roller according to claim 8, wherein the stopping element sections are shaped as stopping gear elements that are radially adjustable to the torsion rod assembly and wherein corresponding ring gears are provided on both the torsion rod and on the at least one torsion sleeve.

10. Belt roller according to claim 8, wherein the stopping element is at least positioned on a stop tappet that is adjustable by the control unit, which limits the stopping element in its adjustment path for a gradual effective connection with the torsion rod assembly.

11. A belt roller for a belt band of a safety belt system of a vehicle seat, comprising:

a pivotable hollow shaft upon which the belt band is rolled-up;
   a torsion rod assembly comprising a torsion rod and at least one torsion sleeve coaxially surrounding the torsion road, the assembly being coaxially arranged inside the hollow shaft and being twistlock coupled at one end thereto;

a stopping mechanism comprising at least two axially offset stopping element sections, the stopping mechanism adjusting an energy absorption capacity of the safety belt system depending upon a weight of a person in the vehicle seat; and a control unit individually or jointly adjusting the two stopping element sections so as to be brought into an effective connection with the torsion rod assembly in response to a defined jerk on the belt band depending on the energy absorption capacity to be applied;

wherein the stopping element sections are located on a common stopping element, with the stopping element sections being placed at intervals in a direction of adjustment of the stopping element such that one stopping element section activating the torsion rod is the first to achieve an effective connection with the torsion rod.

12. A belt roller for a belt band of a safety belt system of a vehicle seat, comprising:

a pivotable hollow shaft upon which the belt band is rolled-up;

a torsion rod assembly comprising a torsion rod and at least one torsion sleeve coaxially surrounding the torsion road, the assembly being coaxially arranged inside the hollow shaft and being twistlock coupled at one end thereto;

a stopping mechanism comprising at least two axially offset stopping element sections, the stopping mechanism adjusting an energy absorption capacity of the safety belt system depending upon a weight of a person in the vehicle seat; and a control unit individually or jointly adjusting the two stopping element sections so as to be brought into an effective connection with the torsion rod assembly in response to a defined jerk on the belt band depending on the energy absorption capacity to be applied;

wherein a depth of a toothing of a ring gear of the torsion rod is dimensioned such that both in a first position and in a last position of one stopping section, a sufficiently effective contact with the torsion rod assembly is achieved.

* * * * *